United States Patent
Daemen et al.

(10) Patent No.: US 11,354,428 B2
(45) Date of Patent: Jun. 7, 2022

(54) DATA VALUES ENCRYPTION METHOD

(71) Applicant: PROTON WORLD INTERNATIONAL N.V., Diegem (BE)

(72) Inventors: Joan Daemen, Malden (NL); Gilles Van Assche, Woluwe-St-Lambert (BE)

(73) Assignee: PROTON WORLD INTERNATIONAL N.V., Diegem (BE)

( * ) Notice: Subject to any disclaimer, the term of this patent is extended or adjusted under 35 U.S.C. 154(b) by 63 days.

(21) Appl. No.: 17/067,510

(22) Filed: Oct. 9, 2020

(65) Prior Publication Data
US 2021/0110050 A1  Apr. 15, 2021

(30) Foreign Application Priority Data
Oct. 14, 2019 (FR) ...................... 1911404

(51) Int. Cl.
*G06F 21/60* (2013.01)
*G06F 21/72* (2013.01)

(52) U.S. Cl.
CPC ............ *G06F 21/602* (2013.01); *G06F 21/72* (2013.01)

(58) Field of Classification Search
CPC ....... G06F 21/602; G06F 21/72; H04L 9/0618
See application file for complete search history.

(56) References Cited
U.S. PATENT DOCUMENTS
2019/0222421 A1* 7/2019 Daemen ................ H04L 9/0643

OTHER PUBLICATIONS

Babbage et al., "The MICKEY stream ciphers," *New Stream Cipher Designs. Lecture Notes in Computer Science 4986*: 2008, 16 pages.
Berger et al., "The GLUON family: a lightweight Hash function family based on FCSRs," 5th International Conference on Cryptology in Africa, Ifrance, Morocco, Jul. 10-12, 2012, 18 pages.
Bertoni et al., "CAESAR submission: Keyak v2," STMicroelectronics, Radboud University Nijmegen, version 2.2, Sep. 15, 2016, 35 pages.
Bertoni et al., "Farfalle: parallel permutation-based cryptography," *IACR Transactions on Symmetric Cryptology 2017*(4): 2017, 38 pages.

(Continued)

*Primary Examiner* — Jung W Kim
*Assistant Examiner* — Sangseok Park
(74) *Attorney, Agent, or Firm* — Seed IP Law Group LLP (57) ABSTRACT

A method encrypts, using an encryption circuit, a first data value having a number n of first binary words, each word having a number m of bits. The encrypting includes generating a second data value having a same number n of second binary words of m bits each and outputting a result of the encryption. The number n is an integer greater than or equal to 3, m and n do not have a common integer division, and n or m is even. A second binary word of the second data value having a rank i is equal to a sum of: a first binary word having a same rank i; and a product of: a complement of a first binary word having rank ((i+1)modulo n), shifted by a first number of bit positions; and a first binary word having rank ((i+2)modulo n), shifted by a second number of bit positions.

27 Claims, 4 Drawing Sheets

(56) References Cited

OTHER PUBLICATIONS

Bertoni et al., "On the Indifferentiability of the Sponge Construction," 27th Annual International Conference on the Theory and Applications of Cryptographic Techniques, Istanbul, Turkey, Apr. 13-17, 2008, 17 pages.

Bertoni et al., "Sponge Functions," *ECRYPT hash workshop 2007*(9): 2007, 22 pages.

Bertoni et al., "The Keccak reference," STMicroelectronics, NXP Semiconductors, version 3.0, Jan. 14, 2011, 69 pages.

Cryptology ePrint Archive, "Xoodoo cookbook," downloaded on Mar. 25, 2021 from https://eprint.iacr.org/2018/767, 1 page.

Daemen et al., "Fast Hashing and Stream Encryption with Panama," International Workshop on Fast Software Encryption, Heidelberg, Germany, 1998, pp. 60-74.

Daemen et al., "Full-State Keyed Duplex with Built-In Multi-user Support," 23rd International Conference on the Theory and Applications of Cryptology and Information Security, Hong Kong, China, Dec. 3-7, 2017, pp. 606-637.

Daemen, "Cipher and Hash Function Design Strategies based on linear and differential cryptanalysis," PhD dissertation, Katholieke Universiteit Leuven, Leuven, Belgium, 1995, 267 pages.

Daemen, "Spectral characterization of iterating lossy mappings," International Conference on Security, Privacy, and Applied Cryptography Engineering, Hyderabad, India, Dec. 14-18, 2016, 17 pages.

Daemen et al., "The design of Xoodoo and Xoofff," *IACR Transactions on Symmetric Cryptology 2018*(4): 1-38, 2018.

Hong et al., "TMD-Tradeoff and State Entropy Loss Considerations of Streamcipher MICKEY," 6th International Conference on Cryptology in India, Bangalore, India, Dec. 10-12, 2005, 2 pages.

Keccak Team, "Latest News Sep. 3, 2020March," downloaded on Mar. 25, 2021 from https://keccak.team/index.html, 6 pages.

Keccak Team, "The Ketje authenticated encryption scheme," downloaded on Mar. 25, 2021 from https://keccak.team/ketje.html, 2 pages.

Keccak Team, "The Keyak authenticated encryption scheme," downloaded on Mar. 25, 2021 from https://keccak.team/keyak.html, 2 pages.

Menezes et al., *Handbook of Applied Cryptography*, CRC Press, Boca Raton, Florida, Chapter 7, "Block Ciphers," pp. 223-282, 1997.

Perrin et al., "Collision Spectrum, Entropy Loss, T-Sponges, and Cryptanalysis of GLUON-64," 21st International Workshop, FSE 2014, London, UK, Mar. 3-5, 2014, pp. 82-103.

\* cited by examiner

DATA VALUES ENCRYPTION METHOD

BACKGROUND

Technical Field

The present disclosure relates generally to data values protection, and more specifically to a data values encryption and/or decryption method, a hash method, or a method for calculating a message authentication code (MAC). The present disclosure further relates to devices configured to implement a data values encryption and decryption method.

Background Art

Many techniques exist making it possible to protect data values used by electronic devices. Cryptographic techniques, such as data values encryption, are particularly used for this purpose.

Data values encryption is an operation by which usable and readable data values are transformed, using an algorithm, into data values that can only be read by people or machines knowing this algorithm. This algorithm can, for example, use an encryption and/or decryption key. People seeking to learn these data values, called attackers, can know the algorithm, but without knowing the key.

There is a need for ever more powerful data values encryption methods, and for increasingly strong electronic circuits implementing these methods.

BRIEF SUMMARY

One embodiment provides an encryption method, executed by an electronic circuit, comprising a first operation, applied to a first data value comprising a number of first binary words with m bits each, and supplying a second data value comprising a same number n of second binary words with m bits each, in which each second binary word is equal to the sum of:

the first binary word of equal rank; and the product of the complementary of the first binary word of following rank modulo n whose bits have undergone a shift by a first number of positions, multiplied by the first binary word with a rank equal to the higher rank of the following rank modulo n, whose bits have undergone a shift by a second number of positions, wherein n is greater than or equal to 3, m and n do not have a common integer division, and n or m is even.

According to one embodiment, m is even.

According to one embodiment, the first number is equal to 1.

According to one embodiment, the second number is equal to 2.

According to one embodiment, n is equal to 5.

According to one embodiment, m is equal to 4 or 64.

According to one embodiment:

the sum of the first operation is a bitwise sum;

the product of the first operation is a bitwise product; and the complementary of a binary word of the first operation is the bitwise complementary of a binary word.

According to one embodiment, the method comprises at least one linear second operation.

According to one embodiment, said second operation is a linear diffusion operation.

According to one embodiment, the method comprises a binary word rotation operation in a data value.

According to one embodiment, the method comprises an operation to add a revolution constant.

According to one embodiment, the method comprises a bit shifting operation in the binary words.

An embodiment provides an encryption circuit configured to carry out the encryption method described above.

An embodiment provides a memory comprising a first set of data values to be encrypted and a second set of data values representing the data values of the first set encrypted by the encryption method disclosed above.

In an embodiment, a method, comprises: encrypting, using an encryption circuit, a first data value having a number n of first binary words, each word having a number m of bits, the encrypting including generating a second data value having a same number n of second binary words of m bits each; and outputting a result of the encryption, wherein n is an integer greater than or equal to 3, m and n do not have a common integer division, n or m is even, and a second binary word of the second data value having a rank i is equal to a sum of: a first binary word having a same rank i; and a product of: a complement of a first binary word having rank ((i+1)modulo n), shifted by a first number of bit positions; and a first binary word having rank ((i+2)modulo n), shifted by a second number of bit positions. In an embodiment, the number of bits m is even. In an embodiment, the first number of bit positions is equal to 1 bit position. In an embodiment, the second number of bit positions is equal to 2 bit positions. In an embodiment, the number n of binary words is equal to 5 binary words. In an embodiment, the number of bits m is equal to 4 bits or equal to 64 bits. In an embodiment, the sum is a bitwise sum; the product is a bitwise product; and the complement of a binary word is the bitwise complement of the binary word. In an embodiment, the encrypting comprises applying a linear operation to the second data value. In an embodiment, the encrypting comprises applying one or more linear operations. In an embodiment, the one or more linear operations include a linear diffusion operation. In an embodiment, the one or more linear operations include a binary word rotation operation. In an embodiment, the one or more linear operations include an operation to add a revolution constant. In an embodiment, the one or more linear operations include a binary-word bit shifting operation.

In an embodiment, a device comprises: one or more memories; and digital signal processing circuitry coupled to the one or more memories, which, in operation, encrypts a first data value having a number n of first binary words, each word having a number m of bits, the encrypting including generating a second data value having a same number n of second binary words of m bits each, wherein n is an integer greater than or equal to 3, m and n do not have a common integer division, n or m is even, and a second binary word of the second data value having a rank i is equal to a sum of: a first binary word having a same rank i; and a product of: a complement of a first binary word having rank ((i+1) modulo n), shifted by a first number of bit positions; and a first binary word having rank ((i+2)modulo n), shifted by a second number of bit positions. In an embodiment, the number of bits m is even. In an embodiment, the first number of bit positions is equal to 1 bit position and the second number of bit positions is equal to 2 bit positions. In an embodiment, the number n of binary words is equal to 5 binary words. In an embodiment, the sum is a bitwise sum; the product is a bitwise product; and the complement of a binary word is the bitwise complement of the binary word.

In an embodiment, a method comprises: executing an operation by an electronic circuit; and protecting the electronic circuit during execution of the operation, the protecting including: encrypting, using the encryption circuit, a first data value having a number n of first binary words, each word having a number m of bits, the encrypting including generating a second data value having a same number n of second binary words of m bits each, wherein n is an integer greater than or equal to 3, m and n do not have a common integer division, n or m is even, and a second binary word of the second data value having a rank i is equal to a sum of: a first binary word having a same rank i; and a product of: a complement of a first binary word having rank ((i+1) modulo n), shifted by a first number of bit positions; and a first binary word having rank ((i+2)modulo n), shifted by a second number of bit positions. In an embodiment, the sum is a bitwise sum; the product is a bitwise product; and the complement of a binary word is the bitwise complement of the binary word. In an embodiment, the encrypting comprises applying one or more linear operations.

In an embodiment, a system, comprises: a functional circuit; and digital signal processing circuitry coupled to the functional circuit. The digital processing circuitry, in operation, encrypts a first data value having a number n of first binary words, each word having a number m of bits, the encrypting including generating a second data value having a same number n of second binary words of m bits each, wherein n is an integer greater than or equal to 3, m and n do not have a common integer division, n or m is even, and a second binary word of the second data value having a rank i is equal to a sum of: a first binary word having a same rank i; and a product of: a complement of a first binary word having rank ((i+1)modulo n), shifted by a first number of bit positions; and a first binary word having rank ((i+2)modulo n), shifted by a second number of bit positions. In an embodiment, the encrypting protects an operation of the functional circuit. In an embodiment, the sum is a bitwise sum; the product is a bitwise product; and the complement of a binary word is the bitwise complement of the binary word.

In an embodiment, a non-transitory computer-readable medium's contents configure digital signal processing circuitry to perform a method, the method comprising: executing an operation; and protecting the digital signal processing circuitry during execution of the operation, the protecting including encrypting a first data value having a number n of first binary words, each word having a number m of bits, the encrypting including generating a second data value having a same number n of second binary words of m bits each, wherein n is an integer greater than or equal to 3, m and n do not have a common integer division, n or m is even, and a second binary word of the second data value having a rank i is equal to a sum of: a first binary word having a same rank i; and a product of: a complement of a first binary word having rank ((i+1)modulo n), shifted by a first number of bit positions; and a first binary word having rank ((i+2)modulo n), shifted by a second number of bit positions. In an embodiment, the sum is a bitwise sum; the product is a bitwise product; and the complement of a binary word is the bitwise complement of the binary word. In an embodiment, the contents comprise instructions executed by the digital signal processing circuitry. In an embodiment, the contents comprise a look-up table storing a first set of data values to be encrypted and a corresponding second set of data values.

BRIEF DESCRIPTION OF THE SEVERAL VIEWS OF THE DRAWINGS

The foregoing features and advantages of various embodiments, as well as others, will be described in detail in the following description of specific embodiments given by way of illustration and not limitation with reference to the accompanying drawings, in which.

DETAILED DESCRIPTION

Like features have been designated by like references in the various figures, unless the context indicates otherwise. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless indicated otherwise, when reference is made to absolute positional qualifiers, such as the terms "front", "back", "top", "bottom", "left", "right", etc., or to relative positional qualifiers, such as the terms "above", "below", "higher", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, or within 5%.

Figure 1:
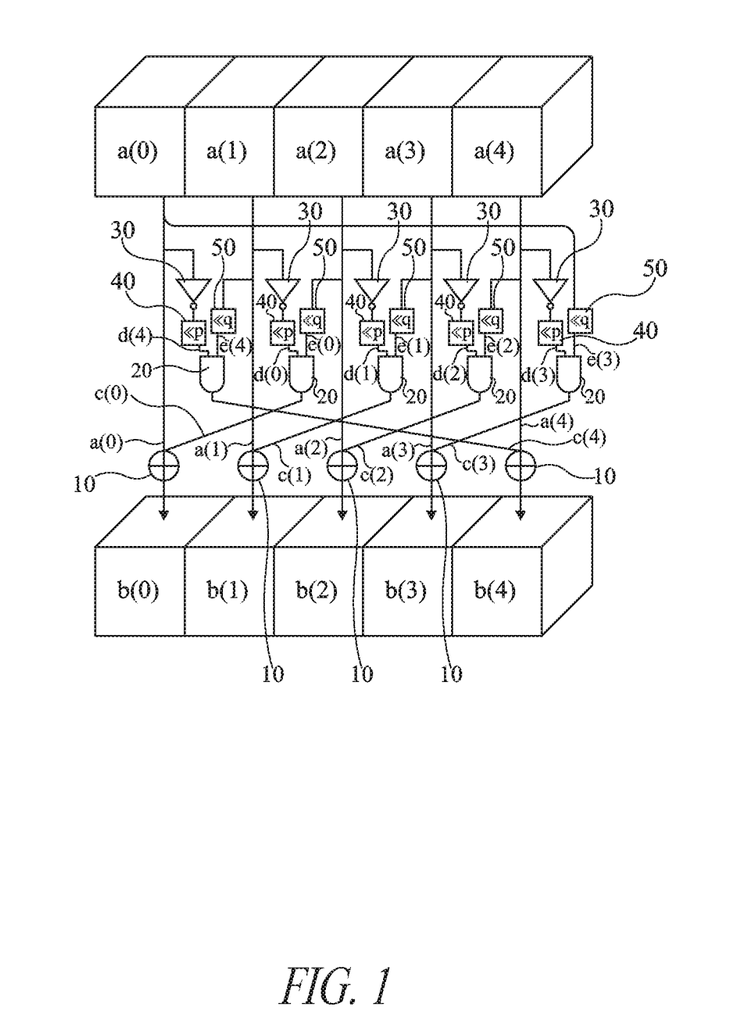
FIG. 1 schematically shows the operation of one embodiment of an encryption operation.

FIG. 1 shows the operation, schematically and in block form, of an encryption operation F able to be used in an encryption method.

The operation F is a function using, as input, a data value a comprising a number n of binary words $a(0), a(1), \ldots, a(n-1)$. Each binary word $a(0), a(1), \ldots, a(n-1)$ is made up of a number m of bits, where m is an integer.

The operation F provides, as output, a data value b of the same type as the data value a, that is to say, comprising a same number n of binary words $b(0), b(1), \ldots, b(n-1)$, each binary word $b(0), b(1), \ldots, b(n-1)$ being made up of the same number m of bits. In the example illustrated in FIG. 1, each data value a, respectively b, comprises n=5 binary words $a(0)$ to $a(4)$, respectively $b(0)$ to $b(4)$.

Each binary word $b(i)$, i varying from 0 to n−1, is defined as being the sum of the binary word $a(i)$ and a binary word $c(i)$. The sum operation is a bitwise modulo two operation, and is designated in FIG. 1 by a gate 10 (+). The binary word $b(i)$ may be defined by the following formula:

$$b(i)=(a(i)+c(i)) \bmod 2 \qquad \text{Math 1}$$

where:
 the "+" sign designates a bitwise sum, or an exclusive OR logic gate; and
 "mod" designates the modulo operation.

Each binary word c(i) comprises said number m of bits, and is the result of a product of two binary numbers d(i) and e(i). The product operation is a bitwise product, and is designated in FIG. 1 by a gate 20 of the AND type. The binary word c(i) may be defined by the following formula:

$$c(i)=d(i)\cdot e(i) \qquad \text{Math 2}$$

where the "·" sign designates a bitwise product, or an exclusive AND logic gate.

The binary word d(i) comprises the number m of bits, and is the result of the complementary of the binary word of following rank relative to the binary word a(i), the bits of which have been shifted by p positions. "Binary word of following rank relative to the binary word a(i)" means that the binary word of following rank relative to the word a(i) is the binary word a(i+1), and that the binary word of rank following the word a(n−1) is the binary word a(0). It will therefore be noted that the binary word of following rank relative to the binary word a(i) is the binary word a(i+1[n]). The complementary operation provides the bitwise complementary, or bitwise complement, of a binary word, and is designated in FIG. 1 by a gate 30 of the inverting type. The operation making it possible to shift the position of the bits of a binary word by p positions is designated in FIG. 1 by a block 40 (<<p). The bit shifting operation in a binary word is for example an operation to shift bits to the left. The binary word d(i) may be defined by the following formula:

$$d(i)=\text{COMP}(a(i+1[n]))<<p \qquad \text{Math 3}$$

where:
 the sign "[n]" indicates modulo n;
 the function "COMPO" designates the bitwise complementary; and
 the sign "<<p" designates the shift by p positions of a bit in a binary word.

The binary word e(i) comprises said number m of bits, and is equal to the binary word of following rank of the binary word a(i), denoted a(i+2 [n]), the bits of which have been shifted by q positions. The operation making it possible to shift the position of the bits of a binary word by q positions is designated in FIG. 1 by a block 50 (<<q). The binary word e(i) may be defined by the following formula:

$$e(i)=a(i+2[n])<<q \qquad \text{Math 4}$$

p and q may be constants determined from propagation analyses. A propagation analysis in particular studies the influence of the modification of a bit in a binary data values encryption algorithm. An example propagation analysis method is given in the article "The design of Xoodoo and Xoofff" by Daemen, J., Hoffert, S., Van Assche, G., & Van Keer, R. (2018). According to one embodiment, the number p is equal to one and the number q is equal to two.

In other words, each binary word b(i) may be considered as a result of the application, to the binary word a(i), of the operation F defined by the following formula:

$$b(i)=F(a(i))=a(i)+a(i+1[n]))<<1)\cdot(a(i+2[n])<<2) \qquad \text{Math 5}$$

The operation F is a reversible operation if and only if the product of the number of binary words n in a data value and the length m of a binary word is odd. Under these conditions, the operation F can be used as a permutation in an encryption algorithm.

According to one embodiment, the number n is greater than or equal to 3. The numbers m and n do not have a common integer division. The number m or the number n is even. In this case, the operation F is not reversible. However, the likelihood of two data values having the same antecedent is given by the following formula:

$$2^{-n*m}=1+2^{1-n*m/2}+2^{1-n*m}) \qquad \text{Math 6}$$

As an example, for a data value a comprising n=5 binary words with m=4 bits, this likelihood is in the order of $9.5*10^{\wedge}(-7)$. According to another example, for a data value a comprising n=5 binary words with m=64 bits, this likelihood is in the order of $4.7*10^{\wedge}(-97)$. These likelihoods are very low. One advantage of this operation F is therefore that it can be used as a permutation under the conditions mentioned above.

Figure 2:
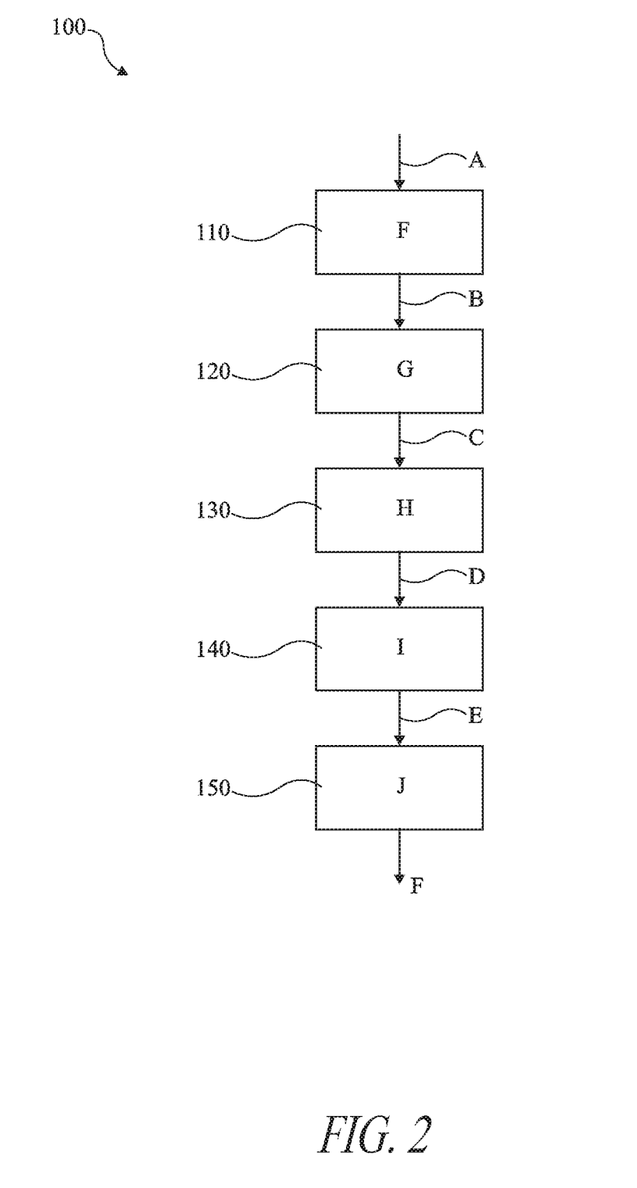
FIG. 2 shows, schematically and in block diagram form, one embodiment of a data values encryption algorithm.

FIG. 2 illustrates, schematically and in block diagram form, one exemplary embodiment of an algorithm 100 using the operation F disclosed in relation with FIG. 1. As an example, the operation F can be used in a cyclic function, or in a permutation. This cyclic function, or this permutation, can be used in an algorithm, for example, an encryption, hash or calculation algorithm, or in an authenticated encryption scheme. As an example, the algorithm 100 is an encryption algorithm.

The encryption algorithm 100 is applied to encrypt a data value 100 comprising n binary words A(0), A(1), . . . , A(n−1) with m bits each. As an example, the data value A comprises n=5 binary words each comprising m=64 bits.

In a step 110, the operation F is applied to the data value A, as disclosed in relation with FIG. 1, in order to supply a data value B. As previously disclosed, the data value B comprises n binary words B(0), B(1), . . . , B(n−1) with m bits each.

In a step 120, a linear diffusion operation G is applied to the data value B in order to provide a data value C comprising n binary words C(0), C(1), . . . , C(n−1) with m bits each. Each binary word C(i), i varying from 0 to n−1, is the result of the bitwise sum modulo two of the binary word B(i) and a constant K defined by the following formula:

$$K=\left(\sum_{i=0}^{n-1}B(i)\right)\ll r+\left(\sum_{i=0}^{n-1}B(i)\right)\ll s \qquad \text{Math 7}$$

r and s are, like the constants p and q, constants which may be determined from propagation analyses. According to one embodiment, r is equal to 12 and s is equal to 17.

In a step 130, a rotation operation H is applied to the data value C in order to provide a data value D comprising n binary words D(0), D(1), . . . , D(n−1) with m bits each. Each binary word D(i) is equal to the binary word of the data value C of higher rank, that is to say, the binary word C(i+1 [n]).

In a step 140, a revolution constant addition operation I is applied to the data value D in order to provide a data value E comprising n binary words E(0), E(1), . . . , E(n−1) with m bits each. Each binary word E(i) is equal to the sum modulo two of the binary word D(i) and a revolution constant T(j), with j varying between 0 and the number of revolutions of the algorithm 100, that is to say, the number of times that the algorithm is applied to a data value. The revolution constant T(j) is, for example, defined by the integer immediately below the figure defined by the following formula:

$$2^{62-j}\pi \qquad \text{Math 8}$$

In a step 150, a bit shifting operation J is applied to the data value E in order to provide a data value F comprising n binary words F(0), F(1), . . . , F(n−1) with m bits each. Each binary word F(i) is defined by the following formula:

$$F(i)=E(i)<<v(i) \qquad \text{Math 9}$$

where v(i) is a component of a vector v comprising n components v(0), v(1), . . . , v(n−1), each of these components being an integer.

According to one embodiment, when n=5, v is, for example, equal to (0, 2, 10, 19, 33).

The data value F is therefore the result of the encryption of the data value A by the encryption method 100.

Figure 3:
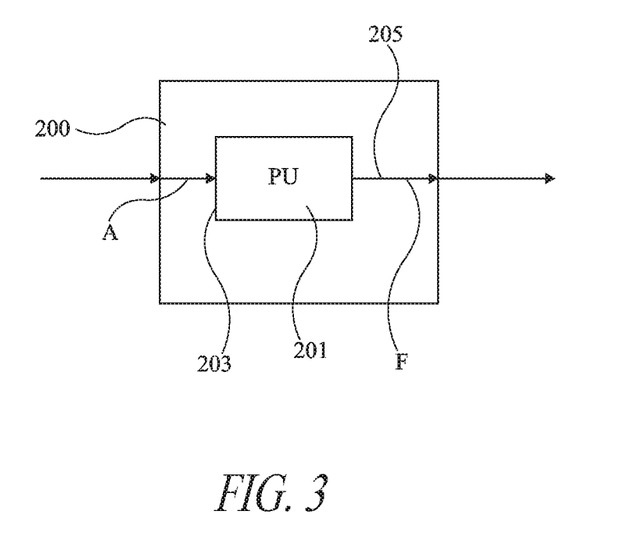
FIG. 3 shows, schematically and in block diagram form, one embodiment of an encryption device.

FIG. 3 shows, schematically and in block diagram form, one embodiment of an electronic encryption device 200 comprising an encryption circuit 201 (PU).

The encryption circuit 201 is configured to implement the encryption algorithm disclosed in relation with FIG. 2. To that end, the encryption circuit 201 comprises, inter alia, an input 203 and an output 205. The input 203 is configured to receive the data value A disclosed in relation with FIG. 2. The output 205 is configured to supply the data value F disclosed in relation with FIG. 2.

The encryption circuit 201 for example comprises a digital processing unit of the digital signal processor (DSP) or microprocessor type.

Figure 4:
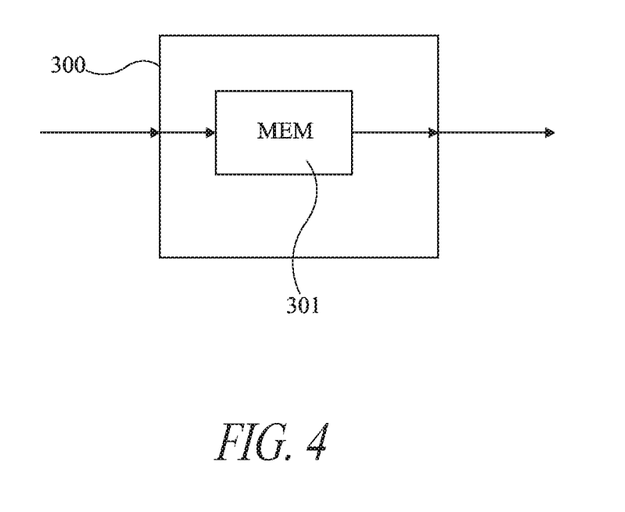
FIG. 4 shows, schematically and in block diagram form, another embodiment of an encryption device.

FIG. 4 shows, schematically and in block diagram form, another embodiment of an encryption module or circuit 300 comprising a memory 301 (MEM).

The memory 301 comprises a match or look-up table associating a dataset of the type of the data value A disclosed in relation with FIG. 2, with a set comprising the set of images of these data values by the algorithm disclosed in relation with FIG. 2.

Figure 5:
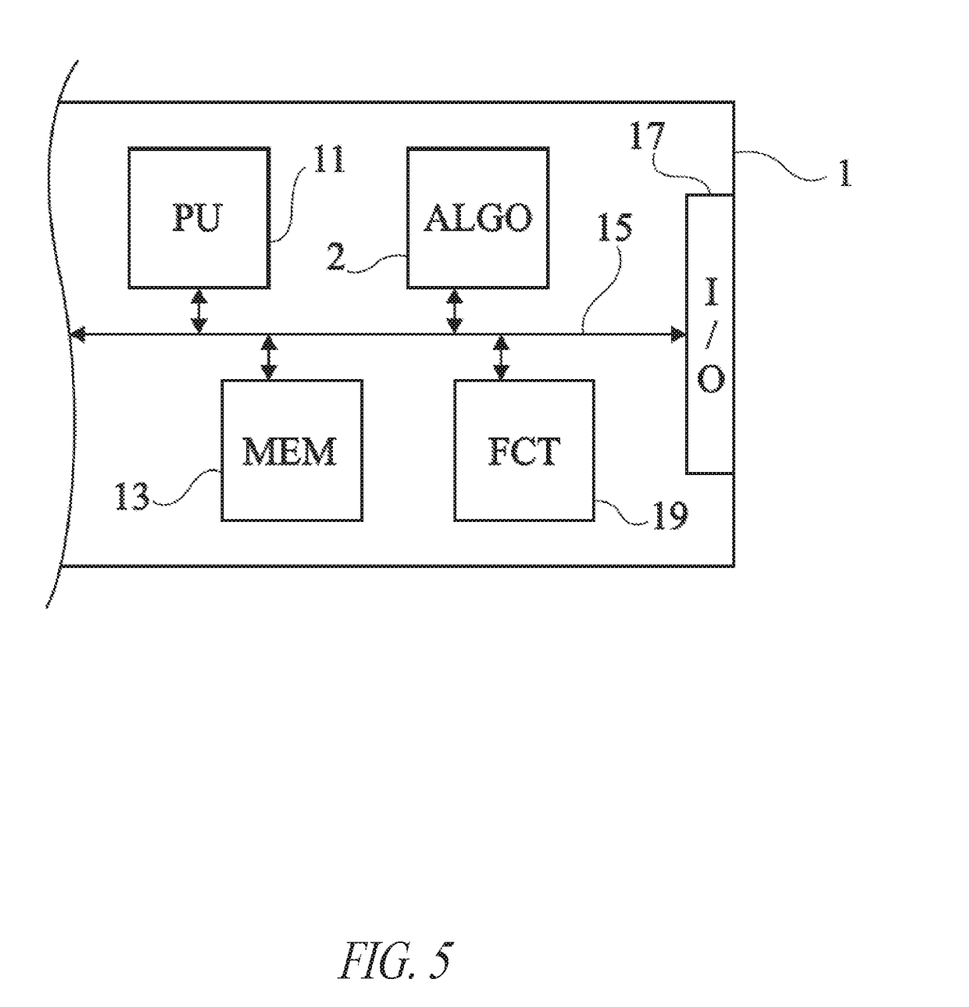
FIG. 5 very schematically shows, in the form of blocks, an embodiment of an electronic circuit of the type to which the embodiments which will be described may apply.

FIG. 5 very schematically shows an embodiment of an electronic circuit 1 of the type to which the described embodiments may apply. Circuit 1 comprises: a processing circuit 11 (PU), for example, a state machine, a microprocessor, a programmable logic circuit, one or more processing cores, etc.; one or a plurality of volatile and/or non-volatile storage areas 13 (MEM) for storing all or part of the data and programs; one or a plurality of data, address, and/or control buses 15 between the different elements internal to circuit 1; an input-output interface 17 (I/O) for communicating with the outside of circuit 1; and various other circuits according to the application, symbolized in FIG. 1 by a block 19 (FCT).

According to the shown embodiment, circuit 1 further comprises an encryption circuit or function 2 (ALGO) implementing one or a plurality of encryption algorithms. Element 2 may be a hardware circuit executing the encryption algorithm in hardware fashion (wired logic), a software function executing a program implemented by a processor (for example, circuit 11), a look-up table, various combinations thereof, etc. For example, the circuit 200 of FIG. 3 or the circuit 300 of FIG. 4 may be employed. In an example of application to printer cartridges, a cartridge and a printer may be equipped with circuits of the type in FIG. 1.

Various embodiments and variants have been described. Those skilled in the art will understand that certain features of these embodiments can be combined and other variants will readily occur to those skilled in the art. In particular, the operation F can be applied to encryption algorithms other than that disclosed in relation with FIG. 2.

Finally, the practical implementation of the embodiments and variants described herein is within the capabilities of those skilled in the art based on the functional description provided hereinabove.

Some embodiments may take the form of or comprise computer program products. For example, according to one embodiment there is provided a computer readable medium comprising a computer program adapted to perform one or more of the methods or functions described above. The medium may be a physical storage medium, such as for example a Read Only Memory (ROM) chip, or a disk such as a Digital Versatile Disk (DVD-ROM), Compact Disk (CD-ROM), a hard disk, a memory, a network, or a portable media article to be read by an appropriate drive or via an appropriate connection, including as encoded in one or more barcodes or other related codes stored on one or more such computer-readable mediums and being readable by an appropriate reader device.

Furthermore, in some embodiments, some or all of the methods and/or functionality may be implemented or provided in other manners, such as at least partially in firmware and/or hardware, including, but not limited to, one or more application-specific integrated circuits (ASICs), digital signal processors, discrete circuitry, logic gates, standard integrated circuits, controllers (e.g., by executing appropriate instructions, and including microcontrollers and/or embedded controllers), field-programmable gate arrays (FPGAs), complex programmable logic devices (CPLDs), etc., as well as devices that employ RFID technology, and various combinations thereof.

The various embodiments described above can be combined to provide further embodiments. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of protecting an electronic device during execution of an operation, the protecting comprising:
   encrypting, using an encryption circuit, a first data value having a number n of first binary words, each word having a number m of bits, the encrypting including generating a second data value having a same number n of second binary words of m bits each; and
   outputting a result of the encryption, wherein n is an integer greater than or equal to 3, m and n do not have a common integer division, n or m is even, and a second binary word of the second data value having a rank i is equal to a sum of:
   a binary word of the first binary words having a same rank i; and
   a product of:
   a complement of a binary word of the first binary words having a rank ((i+1)modulo n), shifted by a first number of bit positions; and
   a binary word of the first binary words having a rank ((i+2)modulo n), shifted by a second number of bit positions.

2. The method according to claim 1, wherein the number of bits m is even.

3. The method according to claim 1, wherein the first number of bit positions is equal to 1 bit position.

4. The method according to claim 1, wherein the second number of bit positions is equal to 2 bit positions.

5. The method according to claim 1, wherein the number n of binary words is equal to 5 binary words.

6. The method according to claim 1, wherein the number of bits m is equal to 4 bits or equal to 64 bits.

7. The method according to claim 1, wherein:
the sum is a bitwise sum;
the product is a bitwise product; and
the complement of a binary word is the bitwise complement of the binary word.

8. The method according to claim 1, wherein the encrypting comprises applying a linear operation to the second data value.

9. The method according to claim 1, wherein the encrypting comprises applying one or more linear operations.

10. The method according to claim 9, wherein the one or more linear operations include a linear diffusion operation.

11. The method according to claim 9, wherein the one or more linear operations include a binary word rotation operation.

12. The method according to claim 9, wherein the one or more linear operations include an operation to add a revolution constant.

13. The method according to claim 9, wherein the one or more linear operations include a binary-word bit shifting operation.

14. A device, comprising:
one or more memories; and
digital signal processing circuitry coupled to the one or more memories, which, in operation, protects data values used by the device, the protecting including encrypting a first data value having a number n of first binary words, each word having a number m of bits, the encrypting including generating a second data value having a same number n of second binary words of m bits each, wherein n is an integer greater than or equal to 3, m and n do not have a common integer division, nor m is even, and a second binary word of the second data value having a rank i is equal to a sum of:
a binary word of the first binary words having a same rank i; and
a product of:
a complement of a binary word of the first binary words having a rank ((i+1)modulo n), shifted by a first number of bit positions; and
a binary word of the first binary words having a rank ((i+2)modulo n), shifted by a second number of bit positions.

15. The device according to claim 14, wherein the number of bits m is even.

16. The device according to claim 14, wherein the first number of bit positions is equal to 1 bit position and the second number of bit positions is equal to 2 bit positions.

17. The device according to claim 14, wherein the number n of binary words is equal to 5 binary words.

18. The device according to claim 14, wherein:
the sum is a bitwise sum;
the product is a bitwise product; and
the complement of a binary word is the bitwise complement of the binary word.

19. A method, comprising:
executing an operation by an electronic circuit; and
protecting the electronic circuit during execution of the operation, the protecting including:
encrypting, using an encryption circuit, a first data value having a number n of first binary words, each word having a number m of bits, the encrypting including generating a second data value having a same number n of second binary words of m bits each, wherein n is an integer greater than or equal to 3, m and n do not have a common integer division, nor m is even, and a second binary word of the second data value having a rank i is equal to a sum of:
a binary word of the first binary words having a same rank i; and
a product of:
a complement of a binary word of the first binary words having a rank ((i+1)modulo n), shifted by a first number of bit positions; and
a binary word of the first binary words having a rank ((i+2)modulo n), shifted by a second number of bit positions.

20. The method according to claim 19, wherein:
the sum is a bitwise sum;
the product is a bitwise product; and
the complement of a binary word is the bitwise complement of the binary word.

21. The method according to claim 19, wherein the encrypting comprises applying one or more linear operations.

22. A system, comprising:
a functional circuit; and
digital signal processing circuitry coupled to the functional circuit, wherein the digital signal processing circuitry, in operation, encrypts a first data value having a number n of first binary words, each word having a number m of bits, the encrypting including generating a second data value having a same number n of second binary words of m bits each, wherein n is an integer greater than or equal to 3, m and n do not have a common integer division, norm is even, and a second binary word of the second data value having a rank i is equal to a sum of:
a binary word of the first binary words having a same rank i; and
a product of:
a complement of a binary word of the first binary words having a rank ((i+1)modulo n), shifted by a first number of bit positions; and
a binary word of the first binary words having a rank ((i+2)modulo n), shifted by a second number of bit positions, wherein the encrypting protects an operation of the functional circuit.

23. The system according to claim 22, wherein:
the sum is a bitwise sum;
the product is a bitwise product; and
the complement of a binary word is the bitwise complement of the binary word.

24. A non-transitory computer-readable medium having contents which configure digital signal processing circuitry to perform a method, the method comprising:
executing an operation; and
protecting the digital signal processing circuitry during execution of the operation, the protecting including encrypting a first data value having a number n of first binary words, each word having a number m of bits, the encrypting including generating a second data value having a same number n of second binary words of m bits each, wherein n is an integer greater than or equal to 3, m and n do not have a common integer division, norm is even, and a second binary word of the second data value having a rank i is equal to a sum of:
- a binary word of the first binary words having a same rank i; and
- a product of:
  - a complement of a binary word of the first binary words having a rank ((i+1)modulo n), shifted by a first number of bit positions; and
  - a binary word of the first binary words having a rank ((i+2)modulo n), shifted by a second number of bit positions.

25. The non-transitory computer-readable medium according to claim 24, wherein:
the sum is a bitwise sum;
the product is a bitwise product; and
the complement of a binary word is the bitwise complement of the binary word.

26. The non-transitory computer-readable medium according to claim 24, wherein the contents comprise instructions executed by the digital signal processing circuitry.

27. The non-transitory computer-readable medium according to claim 24, wherein the contents comprise a look-up table storing a first set of data values to be encrypted and a corresponding second set of data values.

* * * * *

UNITED STATES PATENT AND TRADEMARK OFFICE
CERTIFICATE OF CORRECTION

PATENT NO. : 11,354,428 B2
APPLICATION NO. : 17/067510
DATED : June 7, 2022
INVENTOR(S) : Joan Daemen et al.

It is certified that error appears in the above-identified patent and that said Letters Patent is hereby corrected as shown below:

In the Claims

Column 9, Claim 14, Line 41:
"nor" should read: --n or--.

Column 10, Claim 19, Line 7:
"nor" should read: --n or--.

Column 10, Claim 22, Line 38:
"norm" should read: --n or m--.

Column 11, Claim 24, Line 1:
"norm" should read: --n or m--.

Signed and Sealed this
Sixth Day of September, 2022

Katherine Kelly Vidal
*Director of the United States Patent and Trademark Office*